3,661,992
1,2,3,4-TETRAHYDRO-1,1,4,4-TETRAMETHYL-2-NAPHTHYLAMINES
Royal E. Bright, Penfield Downs, Richard W. Rees, Newtown Square, and Herchel Smith, Bryn Mawr, Pa., assignors to American Home Products Corporation, New York, N.Y.
No Drawing. Filed June 29, 1970, Ser. No. 51,000
Int. Cl. C07c 87/28, 87/66, 129/08
U.S. Cl. 260—570.8 R     7 Claims

ABSTRACT OF THE DISCLOSURE

Compounds of the formula

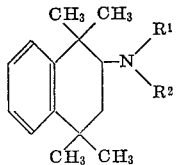

wherein $R^1$ is hydrogen or methyl; and $R^2$ is lower alkyl, lower alkenyl, phenyl (lower) alkyl, N-amidinoamidino, or 2-guanidino ethyl are prepared from 1,2,3,4-tetrahydro-1,1,4,4-tetramethyl-2-aminonaphthyl amine. The final compounds exert mydriatic activity.

BACKGROUND OF THE INVENTION

This invention relates to compositions of matter classified in the art of chemistry as substituted 1,2,3,4-tetrahydro-1,1,4,4-tetramethyl-2-naphthylamines and the non-toxic acid addition salts thereof, which in standard pharmacological tests in animals exert mydriatic activity, evidencing their usefulness as anticholinergic agents.

SUMMARY OF THE INVENTION

The invention sought to be patented as a principal composition of matter resides in the concept of a chemical compound selected from the group represented by Formula I:

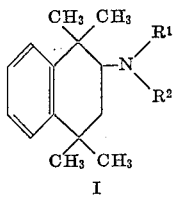

I wherein $R^1$ is hydrogen or methyl, and $R^2$ is lower alkyl, lower alkenyl, phenyl (lower) alkyl, N-amidinoamidino, or 2-guanidinoethyl and the non-toxic addition salts thereof.

The tangible embodiments of the principal compositions of the invention possess in the acid salt form the inherent general physical characteristics of being high melting, white crystalline solids; are substantially soluble in water; and are soluble in polar organic solvents such as lower aliphatic alcohols, and the like. Examination of compounds produced according to the hereinafter described process reveals, upon infrared and nuclear magnetic resonance spectographic analysis, spectral data confirming the molecular structure hereinbefore set forth. The physical characteristics, taken together with the nature of the starting materials and the mode of synthesis, positively confirm the structure of the compositions to be patented.

The tangible embodiments of the principal compositions possess the inherent applied use characteristics of exerting mydriatic activity in animals in standard pharmacological tests, evidencing their usefulness as anticholinergic agents. The mydriatic activity of the compositions can be elicited by following the test procedure described by R. A. Turner in "Screening Methods in Pharmacology," Academic Press, New York, 1965, page 135, a generally accepted test procedure for anticholinergic agents. In this test, mice are administered the compound orally, and pupil diameters are measured at intervals with a dissecting microscope. The compounds of the invention exhibit mydriatic activity in mice at a dose of from 10 to 125 mg. per kilogram of body weight.

The invention sought to be patented as its second composition of matter aspect resides in the concept of the chemical compound 1,1,4,4-tetramethyl-1,2,3,4-tetrahydro-2-naphthylamine, and the non-toxic acid addition salts thereof.

The tangible embodiment of the second composition of matter aspect of the invention possesses in the acid form the inherent general physical characteristics of being a high melting, white solid; is soluble in water; is soluble in organic solvents such as lower aliphatic alcohols and the like. Examination of compounds produced according to the hereinafter described process reveals, upon infrared and nuclear magnetic resonance spectroscopic analysis, spectral data confirming the molecular structure hereinbefore set forth. The physical characteristics taken together with the nature of the starting materials and the mode of synthesis; positively confirm the structure of the compositions to be patented.

The tangible embodiment of the second composition aspects of the invention possesses the inherent applied use characteristics of being the intermediate for the preparation of the substituted 1,1,4,4-tetramethyl-1,2,3,4-tetrahydro-2-naphthylamines of Formula I.

As used herein the term "lower alkyl" means a saturated hydrocarbon radical, including the straight and branched radicals, having from 1 to 4 carbon atoms, among which are for the purposes of illustration, but without limiting the generality of the foregoing, methyl, ethyl, n-propyl, i-propyl, n-butyl, and t-butyl. The term "lower alkenyl" means an unsaturated hydrocarbon radical, including straight and branched radicals, have from 3 to 5 carbon atoms, among which are for the purposes of illustration, but without limiting the generality of the foregoing, alkyl, 2-butenyl, 3-methyl-2-butenyl, 2-methyl-2-butenyl, and 2-pentenyl. The term "halo" means the chlorine, bromine, and iodine radicals.

The processes for making the compositions of the invention will now be generally described so as to enable a person skilled in the art to make a specific embodiment as follows:

DESCRIPTION OF THE PREFERRED EMBODIMENT

The processes are illustrated for the specific embodiment thereof in FIG. A, wherein the compounds are assigned Roman numerals for identification.

Referring to FIG. A, the first step in making the principal compositions of the invention is the preparation of 1,2,3,4 - tetrahydro - 1,1,4,4 - tetramethyl - 2 - naphthylamine (III) by the reduction of the oxime of 1,1,4,4-tetramethyltetral-2-one (II). The reduction is carried out with sodium in an absolute lower alkanol, preferably ethanol, at a temperature of from about 75° C. to 120° C. For convenience, the reflux temperature of the alkanol selected is used. The 1,2,3,4 - tetrahydro - 1,1,4,4 - tetramethyl - 2 - naphthylamine (III) so produced is then employed as the intermediate for preparing the principal compositions of Formula I. The compounds of Formula I are in general made by substitution reactions well known in the art of organic chemistry. In order to prepare the monosubstituted compounds (IV), a convenient method is to treat 1,2,3,4 - tetrahydro - 1,1,4,4 - tetramethyl-2-naphthylamine (III) with one mole equivalent of an appropriate lower alkyl halide, lower alkenyl halide, or phenyl (lower) alkyl halide. The substitution is carried out in the presence of an organic acceptor, preferably di-isopropyl ethyl amine, in an organic solvent at a temperature of from about 60° C. to 120° C. Benzene and toluene are particularly useful solvents, but it will be apparent to an organic chemist that any solvent can be used which will not interfere with the course of the reaction. For convenience, the reflux temperature of the solvent selected can be employed. The mono-substituted tetrahydronaphthylamine (IV) is isolated by conventional methods.

If desired, the mono-substituted tetrahydronaphthylamine (IV) can be methylated to give the N-methyl tertiary amines (VI). A preferred method for the methylation reaction is to first carbethoxylate the mono-substituted tetrahydronaphthylamine by treatment with ethyl chloroformate in an unreactive organic solvent, such as methylene chloride or chloroform. For best results, a weak inorganic base, such as sodium bicarbonate or potassium carbonate, is added to the reaction mixture. The temperature of the carbethoxylation reaction is not critical, and, for convenience, room temperature is used. The

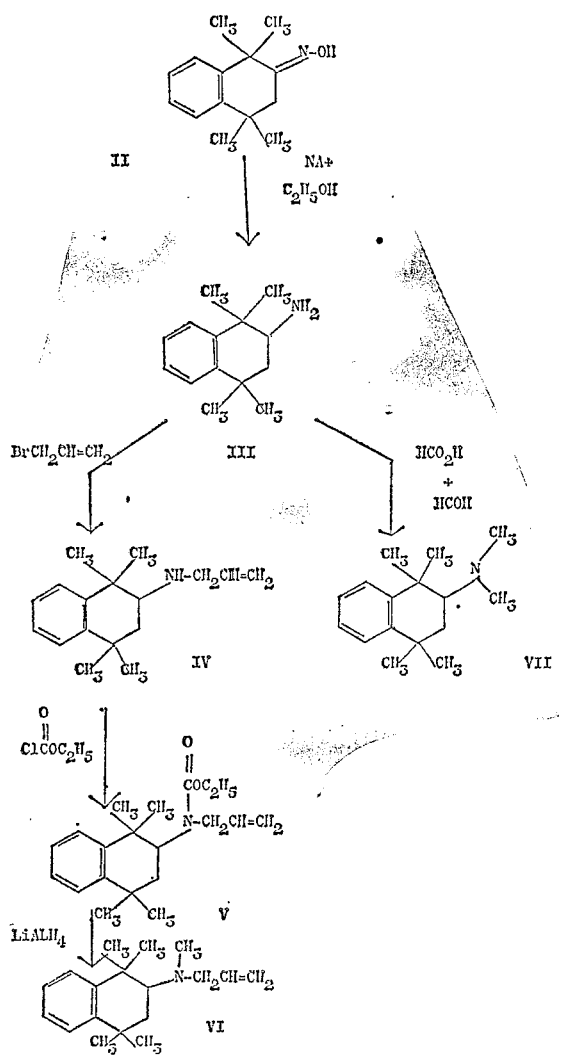

carbethoxylated amine (V) is then reacted with a reducing agent, preferably lithium aluminium hydride, in ether to afford the N-methyl tertiary amine (IV), which is isolated by standard purification procedures.

If it is desired to prepare the N,N-dimethyl tertiary amines (VII), a particularly useful method is to employ the well-known Eschweiler-Clarke procedure in which 1,2,3,4 - tetrahydro - 1,1,4,4 - tetramethyl - 2 - naphthylamine (III) is reacted with a mixture of 90% formic acid and 37% Formalin. After removal of excess formic acid and formaldehyde, 1,2,3,4 - tetrahydro - N,N,1,1, 4,4 - hexamethyl - 2 - naphthylamine is recovered by standard purification procedures.

It will be apparent to one skilled in the art of organic chemistry, that the mono-substituted amine (IV) can be treated with a second mole equivalent of an appropriate alkylhalide, alkenyl halide, or phenylalkyl halide. The disubstituted tertiary amines so formed are equivalent to the invention disclosed and claimed for the purposes disclosed herein.

1,1,4,4 - tetramethyltetral - 2 - one, oxime (II), the starting compound for the preparation of 1,2,3,4 - tetrahydro - 1,1,4,4 - tetramethyl - 2 - naphthylamine (III), is described by H. A. Bruson et al. in the Journal of the American Chemical Society, 80, 3633 (1958). The oxime (II) is prepared by first condensing 2,2,5,5-tetramethyl - 2,3,4,5 - tetrahydro - 3 - furanone with benzene in the presence of an alkylation catalyst such as aluminum chloride followed by treating the resulting 1,1,4,4-tetramethyltetral - 2 - one with hydroxylamine. It will be apparent to those skilled in the art of organic chemistry that veratrole can be used in place of benzene in the condensation reaction and that the resulting 6,7 - dimethoxy - 1,1,4,4 - tetramethyltetral - 2 - one can be used without interfering with subsequent reactions. Products prepared from veratrole containing two methoxyl groups in the 6,7-positions, when used for the purposes of the invention herein disclosed, are full equivalents of the invention as particularly claimed and described.

It will be obvious to one skilled in the art of chemistry that the benzene moiety of the disubstituted amines of Formula I can be substituted with various radicals. Accordingly, the benzene moiety can be substituted with one or more nitro, amino, halo, lower alkyl, hydroxyl, or lower alkoxyl radicals, and the like, and the compounds containing such groups are full equivalents for the purposes of this invention.

The following examples illustrate the best mode contemplated by the inventors for preparing the compositions of the invention.

EXAMPLE I 1,2,3,4-tetrahydro-1,1,4,4-tetramethyl-2-naphthylamine, hydrochloride

The oxime of tetramethyltetralone (5 g.) is dissolved in 300 ml. of absolute ethanol and refluxed, while 15 g. of sodium are added gradually over a period of one hour. After cooling, the reaction is concentrated in vacuo, diluted with water, and extracted with ethyl acetate. The ethyl acetate solution is then extracted with 2 N hydrochloric acid which in turn, is basified with dilute sodium hydroxide solution and re-extracted with ether. The ether solution is concentrated in vacuo to leave an oil, which is converted into a crystalline hydrochloride salt (1.6 g.), M.P. 263–265° C. Recrystallization from methanol-ether gives a product, M.P. 262–65° C.

*Analysis.*—Calculated for $C_{14}H_{21}NCl$ (percent): C, 70.42; H, 8.87; N, 5.86; Cl, 14.85. Found (percent): C, 70.22; H, 8.54; N, 5.66; Cl, 15.04.

EXAMPLE II

N-allyl-1,2,3,4-tetrahydro-1,1,4,4-tetramethyl-2-naphthylamine hydrochloride

A mixture of 1,2,3,4 - tetrahydro - 1,1,4,4 - tetramethyl-2-naphthylamine (1.6 g., $0.9 \times 10^{-3}$ mole), allyl bromide (1.04 g., $0.87 \times 10^{-3}$ mole) and diisopropyl ethyl amine (2.07 g., 16 × 10⁻³ mole) is refluxed for 2 hours under nitrogen in 10 ml. of benzene. The mixture is cooled and filtered. The filter cake is washed thoroughly with benzene. The solvent is removed from the filtrate under reduced pressure, and the residue taken up in ether. After filtration, the ether is stripped under reduced pressure finishing under high vacuum. The oil so obtained is redissolved in ether and treated with 6 N hydrochloric aicd in isopropanol. The precipitate after one crystallization from methanol-ether gives the title product (750 mg.). Melting point >235° C. (sublimes).

*Analysis.*—Calculated for $C_{17}H_{25}N \cdot HCl$ (percent): C, 72.96; H, 9.37; N, 5.01; Cl, 12.67. Found (percent): C, 72.96; H, 9.07; N, 5.29; Cl, 12.56.

IR analysis:

$\lambda_{max}^{KBr}$. 3.41, 3.60, 3.75 (shoulder), 6.30, 6.75, 6.95μ

NMR analysis: free base has signals at δ=7.21 (singlet, 4 protons) ~5.90 (diffuse multiplet, 1 proton), 5.17 (center of 2 proton multiplet), 3.37 (triplet J=c.p.s., 2 protons), 2.69 (quartet J=10, 4 c.p.s., 1 proton), 1.62 (center of 2 proton multiplet), 1.40, 1.35, 1.28, 1.13 (singlets, total=12 protons) p.p.m.

EXAMPLE III 1,2,3,4-tetrahydro-N-(3-methyl-2-butanyl)-1,1,4,4-tetramethyl-2-naphthylamne, hydrochloride Using a procedure analogous to that described in Example II for the preparation of N-allyl-1,2,3,4-tetrahydro-1,1,4,4-tetramethyl-2-naphthylamine, hydrochloride, there is obtained from 1,2,3,4 - tetrahydro - 1,1,4,4 - tetramethyl - 2 - naphthylamine (5.6 g.) and dimethyl allyl chloride (5.13 g.) 1.44 g. of the title product M.P. 234–236° C.

*Analysis.*—Calculated for $C_{19}H_{29}N \cdot HCl$ (percent): C, 74.11; H, 9.82; N, 4.55; Cl, 11.52. Found (percent): C, 74.23; H, 9.81; N, 4.68; Cl, 11.78.

IR analysis:

$\lambda_{max}^{KBr}$. 3.38, 3.48, 3.63, 3.75, 4.05, 6.29, 6.70, 6.90μ

EXAMPLE IV 1,2,3,4-tetrahydro-1,1,4,4-tetramethyl-N-phenethyl-2-naphthylamine, hydrochloride Using a procedure analogous to that described in Example II for the preparation of N-allyl-1,2,3,4-tetrahydro-1,1,4,4 - tetramethyl - 2 - naphthylamine, hydrochloride there is obtained from 1,2,3,4-tetrahydro-1,1,4,4-tetramethyl - 2 - naphthylamine (1.9 g.) and β-phenethylbromide (3.8 g.), 1.1 g. of the title product M.P. 213–220° C.

*Analysis.*—Calculated for $C_{22}H_{29}N \cdot HCl$ (percent): C, 76.45; H, 8.62; N, 4.07; Cl, 10.31. Found (percent): C, 76.45; H, 8.62; N, 4.17; Cl, 10.59.

IR analysis:

$\lambda_{max}^{KBr}$. 3.40, 3.68 (broad), 6.27, 6.69, 6.81μ

EXAMPLE V

When the procedure of Example I is followed substituting for allyl bromide stoichimetric amounts of the halo compounds shown below there are obtained the following:

| Halo compound | Product |
|---|---|
| Ethyl iodide | N-ethyl-1,2,3,4-tetrahydro-1,1,4,4-tetramethyl-2-naphthylamine, hydrochloride. |
| n-Propyl bromide | N-(n-propyl)-1,2,3,4-tetrahydro-1,1,4,4-tetramethyl-2-naphthylamine, hydrochloride. |
| i-Propyl chloride | N-(i-propyl)-1,2,3,4-tetrahydro-1,1,4,4-tetramethyl-2-naphthylamine, hydrochloride. |
| n-butylbromide | N-(n-butyl)-1,2,3,4-tetrahydro-1,1,4,4-tetramethyl-2-naphthylamine, hydrochloride. |
| i-butyliodide | N-(i-butyl)-1,2,3,4-tetrahydro-1,1,4,4-tetramethyl-2-naphthylamine, hydrochloride. |
| sec-Butylbromide | N-(sec-butyl)-1,2,3,4-tetrahydro-1,1,4,4-tetramethyl-2-naphthylamine, hydrochloride. |
| Benzylchloride | N-(benzyl)-1,2,3,4-tetrahydro-1,1,4,4-tetramethyl-2-naphthylamine, hydrochloride. |
| Phenylethylbromide | 1,2,3,4-tetrahydro-1,1,4,4-tetramethyl-N-phenyletphyl-2-naphthylamine, hydrochloride. |
| 2-methylpropenylbromide | N-(2-methylpropenyl)-1,2,3,4-tetrahydro-1,1,4,4-tetramethyl-2-naphthylamine, hydrochloride. |
| 2-pentenylchloride | N-(2-pentenyl)-1,2,3,4-tetrahydro-1,1,4,4-tetramethyl-2-naphthylamine, hydrochloride. |

EXAMPLE VI

N-allyl-1,2,3,4-tetrahydro-N,1,1,4,4-pentamethyl-2-naphthylamine, hydrochloride

Ethylchloroformate (1.7 g.) is added with stirring to a mixture of N-allyl-1,2,3,4-tetrahydro-1,1,4,4-tetramethyl-2-naphthylamine, hydrochloride (4.0 g.) in 50 ml. of methylene chloride and 50 ml. of 10% sodium bicarbonate solution. Stirring is continued for a few minutes after the addition and the reaction is then allowed to stand for 72 hours. The layers are then separated and the aqueous phase extracted twice with small portions of methylene chloride. The combined organic phase is dried over potassium carbonate and the solvent stripped under reduced pressure. The oil obtained (4.0 g.) is taken up in 25 ml. of ether and refluxed 4 hours with lithium aluminum hydride (1 g.). After cooling and addition of 20 ml. of 3% sodium hydroxide solution the supernatant is separated by filtration and evaporated under reduced pressure to an oil. The oil is dissolved in ether and treated with 6 N hydrochloric acid in isopropanol to precipitate the title product (1.65 g.), M.P. 189–193° C.

*Analysis.*—Calculated for $C_{18}H_{27}N \cdot HCl$ (percent): C, 73.56; H, 9.60; N, 4.77; Cl, 12.07. Found (percent): C, 73.33; H, 9.81; N, 4.70; Cl, 12.33.

IR analysis:

$\lambda_{max}^{KBr}$. 3.39, 6.10, 6.73, 6.95μ

EXAMPLE VII

When the procedures of Example VI are followed substituting for N-allyl-1,2,3,4-tetrahydro-1,1,4,4-tetramethyl-2-naphthylamine stoichiometric amounts of the secondary amines shown below there are obtained the following compounds:

| Secondary amine | Product |
|---|---|
| N-ethyl-1,2,3,4-tetrahydro-1,1,4,4-tetramethyl-2-naphthylamine, hydrochloride. | N-ethyl-1,2,3,4-tetrahydro-N-1,1,4,4-pentamethyl-2-naphthylamine, hydrochloride. |
| N-(n-propyl)-1,2,3,4-tetrahydro-1,1,4,4-tetramethyl-2-naphthylamine, hydrochloride. | N-(n-propyl-1,2,3,4-tetrahydro-N,1,1,4,4-pentamethyl-2-naphthylamine, hydrochloride. |
| N-(i-propyl)-1,2,3,4-tetrahydro-1,1,4,4-tezramethyl-2-naphthylamine, hydrochloride. | N-(i-propyl)-1,2,3,4-tetrahydro-N-1,1,4,4-pentamethyl-2-naphthylamine, hydrochloride. |
| N-(n-butyl)-1,2,3,4-tetrahydro-1,1,4,4-tetramethyl-2-naphthylamine, hydrochloride. | N-(n-butyl)-1,2,3,4-tetrahydro-N,1,1,4,4-pentamethyl-2-naphthylamine, hydrochloride. |
| N-(i-butyl)-1,2,3,4-tetrahydro-1,1,4,4-tetramethyl-2-naphthylamine, hydrochloride. | N-(i-butyl)-1,2,3,4-tetrahydro-N,1,1,4,4-pentamethyl-2-naphthylamine, hydrochloride. |
| N-(sec-butyl)-1,2,3,4-tetrahydro-1,1,4,4-tetramethyl-2-naphthylamine, hydrochloride. | N-(sec-butyl)-1,2,3,4-tetrahydro-N,1,1,4,4-pentamethyl-2-naphthylamine, hydrochloride. |
| N-(benzyl)-1,2,3,4-tetrahydro-1,1,4,4-tetramethyl-2-naphthylamine, hydrochloride. | N-(benzyl)-1,2,3,5-tetrahydro-N,1,1,4,4-pentamethyl-2-naphthylamine, hydrochloride. |
| 1,2,3,4-tetrahydro-1,1,4,4-tetramethyl-N-phenylpropyl-2-naphthylamine, hydrochloride. | 1,2,3,4-tetrahydro-1,1,4,4-tetramethyl-N-phenylpropyl-2-naphthylamine, hydrochloride. |
| N-(2-methypropenyl)-1,2,3,4-tetrahydro-1,1,4,4-tetramethyl-2-naphthylamine, hydrochloride. | N-(2-methylpropenyl)-1,2,3,4-tetrahydro-N,1,1,4,4-pentamethyl-2-naphthylamine, hydrochloride. |
| N-(2-pentenyl)-1,2,3,4-tetrahydro-1,1,4,4-tetramethyl-2-naphthylamine, hydrochloride. | N-(2-pentenyl)-1,2,3,4-tetrahydro-N,1,1,4,4-pentamethyl-2-naphthylamine, hydrochloride. |

EXAMPLE VIII

1,2,3,4-tetrahydro-N,N,1,1,4,4-hexamethyl-2-naphthylamine, hydrochloride 1,2,3,4-tetrahydro - 1,1,4,4 - tetramethyl - 2 - naphthylamine (3.8 g., 0.0187 mole) is refluxed 20 hours with 98% formic acid (5 ml.) and 37% Formalin (6 ml.). After cooling, concentrated hydrochloric acid (25 ml.) is added, and excess formic acid and formaldehyde removed under reduced pressure. The residue is adjusted to pH 12 with the addition of 25% sodium hydroxide solution and extracted with 3 portions of ether. The combined ethereal extracts are washed with water and dried over anhydrous sodium sulfate. Addition of 6 N hydrochloric acid in isopropanol precipitates the title product as a hydrate. Drying at 60° in high vacuum over phosphorous pentoxide gives 3.9 grams of the anhydrous product, M.P. 261–263° C.

*Analysis.*—Calculated for $C_{16}H_{25}N \cdot HCl$ (percent): C, 71.75; H, 9.79; N, 5.23; Cl, 13.24. Found (percent): C, 71.72; H, 9.74; N, 5.34; Cl, 13.48.

IR analysis:

$\lambda_{max.}^{KBr}$ 3.41–3.50, 3.84, 6.15 (weak), 6.79, 6.90$\mu$

NMR analysis: Signals at $=11.35$ (broad multiplet, 1 proton), 7.27 (singlet, 4 protons), 3.47 (triplet, J=8.5 c.p.s., 1 proton), 3.06+2.95 (doublets, J=5 c.p.s. total= 6 protons), 2.01 (doublet, J=8.5 c.p.s., 2 protons), 1.86 (singlet, 3 protons), 1.53, 1.49, 1.38 (singlets total=9 protons) p.p.m.

In addition to mydriatric activity, 1,2,3,4-tetrahydro-N,N-1,1,4,4-hexamethyl - 2 - naphthylamine exerts analgesic activity as evidenced by standard pharmacological testing procedures. The analgesic activity is elicited by administering the compound intraperitoneally to a group of ten rats. The rat's tail is then placed in a beam of high intensity light. Activity is measured by the rat's reaction time in moving the tail out of the light. A comparison is made of the reaction time after administration of the compound with that before administration. The test employed is a modification of the procedure described by D'Amour in the Journal of Pharmacology, vol. 72, page 74 (1941). When tested as described above, 1,2,3,4-tetrahydro-N,N,1,1,4,4-hexamethyl - 2 - naphthylamine exhibits analgesic activity at a dose of 25 mg. per kilogram of body weight.

EXAMPLE IX

1-(1,2,3,4-tetrahydro-1,1,4,4-tetramethyl-2-naphthyl) biguanide, hydrochloride 1,2,3,4-tetrahydro - 1,1,4,4 - tetramethyl - 2 - naphthylamine, hydrochloride (4.8 g.) and dicyandiamide (1.7 g.) are ground together in a mortar and then heated slowly over a period of one half hour to 170° while stirring occasionally. The mixture fuses to a colorless vitreous gum and the temperature is maintained at between 160° and 170° for an additional one half hour. After cooling the solid is taken up in methanol (ca. 100 ml.). Gradual concentration of this solution together with replacement of methanol by 95% ethanol gives crystals (4.18 g.). Recrystallization from methanol-ether yields the title product containing ¼ mole of methanol of solvation (3.0 g.), M.P. 259–264° C.

*Analysis.* — Calculated for $C_{16}H_{25}N_5 \cdot HCl \cdot \frac{1}{4} CH_3OH$ (percent): C, 58.80; H, 8.20; N, 21.10; Cl, 10.68. Found (percent): C, 58.79; H, 8.44; N, 21.23; Cl, 10.95.

IR analysis:

$\lambda_{max.}^{KBr}$ 2.95, 3.10, 3.23, 3.44, 6.09, 6.19, 6.35, 6.59, 6.80, 7.00$\mu$ The title compounds in vitro has the ability to reduce platelet adhesiveness in platelet-rich plasma containing a small amount of adenosine diphosphate, thus evidencing usefulness of the compound as an anti-thrombotic agent.

EXAMPLE X

[2-(1,2,3,4-tetrahyro-1,1,4,4-tetramethyl-2-naphthylamino)ethyl] guanidine, sulfate 1,2,3,4-tetrahydro-1,1,4,4-tetramethyl-2-naphthylamine (9.0 g.), N,N-diisopropyl ethylamne (16.6 g.) and chloroacetonitrile (6.76 g.) are refluxed in benzene (70 ml.) for 6 hours. After filtration the solvent is stripped in vacuo to leave a gummy residue which is dissolved in THF (60 ml.) and ether (60 ml.). After addition of lithium aluminum hydride (4 g.) the reaction is refluxed 3 hours, cooled in an ice bath and decomposed with 3% sodium hydroxide solution (100 ml.). The aluminum salts are removed by filtration through Celite, and after washing the cake thoroughly with ether and benzene the layers in the combined filtrates are separated. The aqueous phase is extracted thrice with ether. The combined organic phase is washed with water, dried over sodium sulfate, and stripped under vacuum to yield an oil which is redissolved in ether and treated with 6 N hydrochloric acid in isopropanol. The precipitate is crystallized from methanol-ether to yield a partially purified product. This is then suspended in 2 N aqueous sodium hydroxide and extracted thrice with ether. The combined ethereal solutions are washed with water, dried over sodium sulfate, and stripped to an oil which is slurried in water (5 ml.). and warmed together with S-methyl isothio urea sulfate (4.6 g.). A vigorous reaction commences almost immediately and the reactions sets to a solid. At this point, heating is stopped and the reaction allowed to stand overnight. The solid after washing with 95% ethanol is recrystallized from 95% ethanol-methanol to give the title product (5.1 g.), M.P. 254–256.5°.

*Analysis.*—Calculated for $C_{34}H_{56}N_8 \cdot H_2SO$ (percent): C, 60.50; H, 8.66; N, 16.60; S, 4.75. Found (percent): C, 60.30; H, 8.72; N, 16.32; S, 4.79.

IR analysis:

$\lambda_{max.}^{KBr}$ 3.10, 3.24, 3.45, 6.05 (shoulder), 6.10, 6.21 (shoulder) $\mu$ From the procedures described herein it is seen that for convenience the compositions are isolated in the form of their acid addition salts. If it is desired to isolate the compositions in the free amine form, the acid salt form can be neutralized with a base, such as sodium hydroxide, and the free amine can be recovered by conventional procedures. For the purposes of the invention described herein, the acid salt form and the free amine form are equivalent.

As used herein, the term "IR" stands for "infrared" and the term "NMR" stands for "nuclear magnetic resonance."

The subject matter which applicants regard as their invention is particularly pointed out and distinctly claimed as follows:

1. A compound of the formula

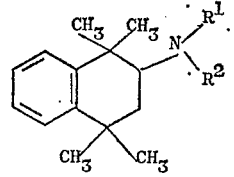

wherein $R^1$ is hyrogen or methyl, and $R^2$ is hydrogen, lower alkyl, lower alkenyl, or phenyl (lower) alkyl, and the non-toxic acid addition salts thereof.

2. A compound as defined in claim 1 which is 1,2,3,4-tetrahydro-1,1,4,4-teramethyl-2-naphthylamine.

3. A compound as defined in claim 2 which is N-allyl-1,2,3,4-tetrahydro-1,1,4,4-tetramethyl-2-naphthylamine.

4. A compound as defined in claim 3 which is 1,2,3,4-tetrahydro-N-(3-methyl-2-butenyl)-1,1,4,4-tetramethyl - 2 - naphthylamine.

5. A compound as defined in claim 4 which is 1,2,3,4-tetrahydro-1,1,4,4-tetramethyl-N-phenethyl-2 - naphthylamine.

6. A compound as defined in claim 5 which is N-allyl-1,2,3,4-tetrahydro-N,1,1,4,4--pentamethyl - 2 - naphthylamine.

7. A compound as defined in claim 6 which is 1,2,3,4-tetrahydro-N,N,1,1,1,4,4-hexamethyl-2-naphthylamine.

References Cited

UNITED STATES PATENTS 3,196,181   7/1965   Rosen et al. _____ 260—578

OTHER REFERENCES

Martin et al., "Journal Pharmaceutical Science," vol. 58, No. 3, pp. 340–7 (1969).

ROBERT V. HINES, Primary Examiner

U.S. Cl. X.R.

260—471 C, 564 A, 564 B, 565, 566 A, 570.9, 577, 578; 424—326, 330